No. 857,325. PATENTED JUNE 18, 1907.
R. E. BROWN.
ANIMAL TRAP.
APPLICATION FILED MAR. 20, 1907.
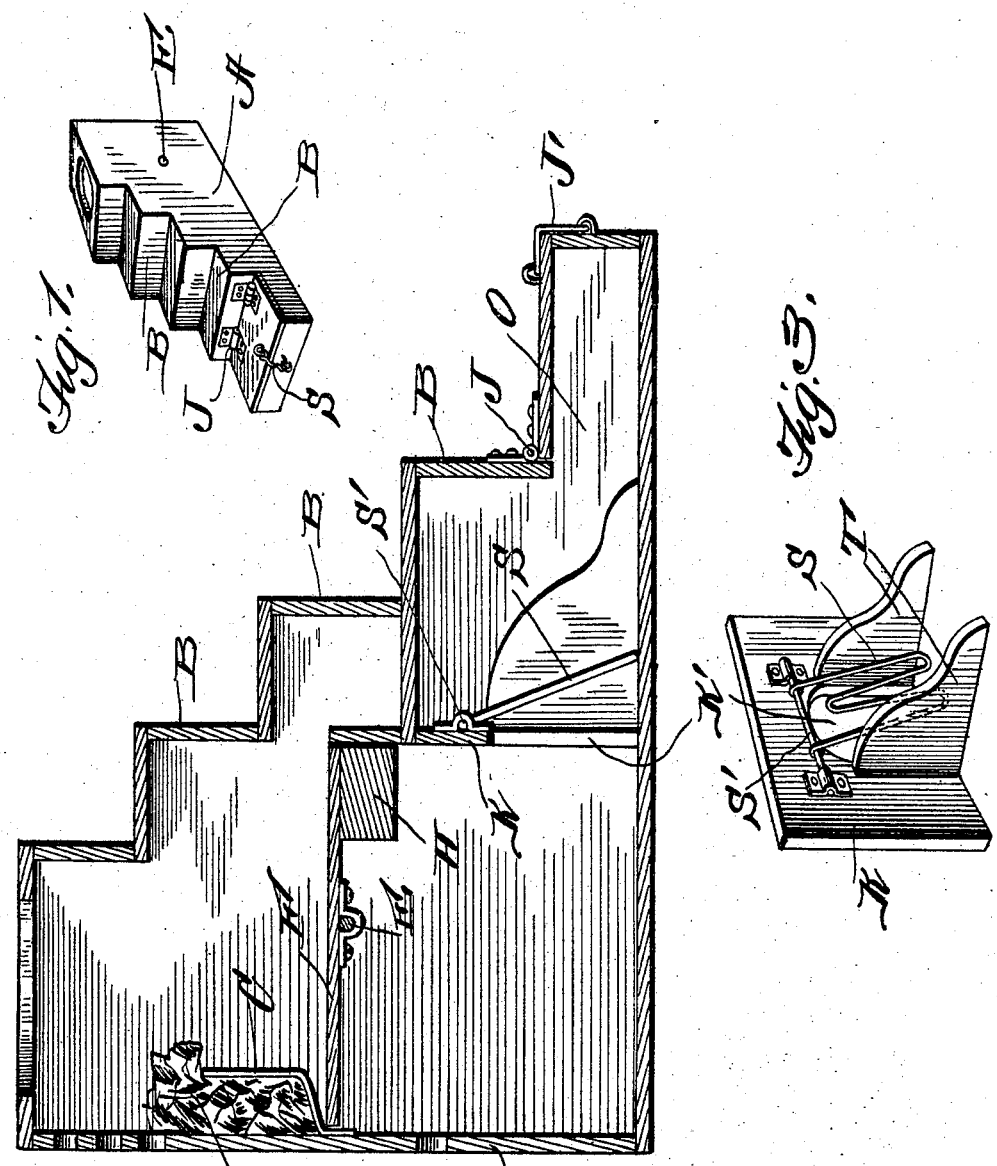
Witnesses
R. A. Boswell.
A. L. Hoyt.
Inventor
R. E. Brown,
By Franklin H. Hough
Attorney

UNITED STATES PATENT OFFICE.

ROBERT EMMETT BROWN, OF WIGGS, ARKANSAS.

ANIMAL-TRAP.

No. 857,325.  Specification of Letters Patent.  Patented June 18, 1907.

Application filed March 20, 1907. Serial No. 363,462.

*To all whom it may concern:*

Be it known that I, ROBERT EMMETT BROWN, a citizen of the United States, residing at Wiggs, in the county of Garland and State of Arkansas, have invented certain new and useful Improvements in Animal-Traps; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in self-setting traps, and the object of the invention is to produce a simple and efficient device of this nature comprising essentially a casing having a series of steps thereon and in the provision of a tilting counterbalanced platform mounted within the casing and so arranged that the weight of an animal will cause the platform to tilt to allow the animal to be precipitated into the casing, after which the platform will be returned to its normal, set position, means being provided to allow the captured animal to pass from the tilting platform compartment into a part of the trap distinct therefrom.

My invention is clearly illustrated in the accompanying drawings, in which:—

Figure 1 is a perspective view of the trap. Fig. 2 is a longitudinal sectional view, and Fig. 3 is a detail perspective view, showing the means for allowing the animal to pass from one compartment of the casing to another.

Reference now being had to the details of the drawings by letter, A designates a casing having a series of steps B formed upon the top thereof whereby an animal may conveniently reach the top of the trap which is left open.

C designates a receptacle mounted within the trap and adapted to hold a bait D.

E designates a shaft supported in the side walls of the trap and upon which the tilting platform F is mounted. H designates a counterbalancing weight which is fixed to said platform at one side of its pivotal center and is adapted to normally hold the platform in a horizontal position. The opposite edge of the platform to that to which the weight is connected is adapted to contact with the bottom of said receptacle C to limit the upper throw of the platform. K designates a partition wall within the casing which is provided with an opening K' through which the animal which has been captured may pass into the compartment O.

S designates a gravity gate mounted upon the rod S' and, when closed, said gate assumes the position shown in Figs. 2 and 3 of the drawings. Wings T project from one face of the partition K and form a guideway between which said gate may have a swinging movement to allow the animal to pass into the compartment O but being prevented from returning when once therein.

In order to have access to the compartment O, the top of the lowest step is hinged, as at J, and a suitable hasp J' is provided whereby said top may be locked.

In operation, the animal being attracted by the bait, may pass up the steps, and when once upon the platform F, the weight of the animal is adapted to overcome the weight H and allow the animal to fall into the compartment underneath the platform, after which the counterbalancing weight H will cause the platform to return to its normal position. The animal seeking to escape may pass through the opening K', the only exit, and raising the gate S, pass into the compartment O, after which the gate S will fall to the position shown in the drawings and the return of the animal to the compartment underneath the platform thereby prevented.

What I claim is:—

A self-setting and ever-set trap, comprising a casing having a series of steps, one of which is hinged and adapted to serve as a door to a compartment of the trap, a weighted platform pivotally mounted within the casing, a bait receptacle fixed to the vertical wall of the casing and projecting laterally therefrom, the under edge of said receptacle adapted to serve as a stop to normally hold the platform in a horizontal position, a partition wall within the casing and provided with an exit passageway, vertically disposed bracket extensions projecting from said partition upon either side of the passageway, and a vertically swinging gate pivotally mounted between said bracket extensions, as set forth.

In testimony whereof I hereunto affix my signature in the presence of two witnesses.

ROBERT EMMETT BROWN.

Witnesses:
    LEE PAYNE,
    LUTHER PARKER.